US006301269B1

(12) United States Patent
Tayloe et al.

(10) Patent No.: US 6,301,269 B1
(45) Date of Patent: Oct. 9, 2001

(54) ATM SWITCHING SYSTEM AND METHOD WITH PROPAGATION DELAY COMPENSATION

(75) Inventors: Daniel Richard Tayloe, Phoenix; Peter Joseph Armbruster; Kajana Aswath Rao, both of Chandler, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/081,746

(22) Filed: May 20, 1998

(51) Int. Cl.[7] ............................... H04J 3/06; H04L 12/56
(52) U.S. Cl. ......................... 370/519; 370/399; 375/362
(58) Field of Search ................................... 370/389, 395, 370/398, 399, 419, 503, 516, 517, 518, 519; 375/354, 362

(56) References Cited

U.S. PATENT DOCUMENTS

| | | | |
|---|---|---|---|
| 4,561,090 | * 12/1985 | Turner | 370/60 |
| 5,627,832 | * 5/1997 | Tanaka | 370/508 |
| 5,631,591 | * 5/1997 | Bar-Niv | 327/158 |
| 5,796,795 | * 8/1998 | Mussman | 375/372 |
| 5,852,632 | * 12/1998 | Capici | 375/238 |
| 5,867,448 | * 2/1999 | Mann | 365/233 |
| 6,081,146 | * 6/2000 | Shiochi | 327/277 |

* cited by examiner

Primary Examiner—Hassan Kizou
Assistant Examiner—Roberta Stevens
(74) Attorney, Agent, or Firm—Gregory J. Gorrie; Frank J. Bogacz

(57) ABSTRACT

A switch system (20) switches at least sixty-four asynchronous transfer mode (ATM) input data streams (22) into at least sixty-four ATM output data streams (24). The switch system (20) includes a backplane assembly (38) having integral data transmission lines, integral clock transmission lines, and discrete slots (36). A single stage space switch circuit card (26), a clock circuit card (28), and input circuit cards (30) are connected to separate slots (36) in the backplane assembly (38). The integral data transmission lines are coupled between the input circuit cards (30) and the switch circuit card (26) and the integral clock transmission lines are coupled between the clock circuit card (28) and the input circuit cards (30). Data path lengths for the integral data transmission lines differ in the backplane assembly (38), and clock path lengths for the clock transmission lines differ in the backplane assembly. A timing compensation element (86) on each of the input circuit cards (30) imparts a time delay to one of the ATM input data streams (22) to compensate for data and clock path length differences so the each of the ATM input data streams (22) arrive at the single stage switch (26) substantially synchronously.

21 Claims, 5 Drawing Sheets

ATM SWITCHING SYSTEM AND METHOD WITH PROPAGATION DELAY COMPENSATION

FIELD OF THE INVENTION

The present invention relates generally to switching systems and, in particular, to single stage switch systems.

BACKGROUND OF THE INVENTION

Asynchronous transfer mode (ATM) is a high bandwidth, low-delay, packet-like switching and multiplexing technique for transferring data across a network using fixed sized cells. The fixed sized cells require lower processing overhead and allow higher transmission speeds than traditional packet switching methods. Each ATM cell contains a payload portion and a header, the latter including a label that associates the cell with a logical communication link between sending and receiving network end systems, i.e., the cell's virtual circuit. Thus, the virtual circuit label for an ATM cell forms the basis on which the ATM cell is routed, or switched, at each network node it encounters.

The ATM cells are asynchronous in that the ATM cells belonging to the same virtual circuit do not necessarily appear in fixed time slots at periodic intervals on the transmission medium. Rather, the position of the ATM cells associated with a particular virtual circuit is random and depends upon the activity of the network. Thus, an ATM system can automatically adjust the network capacity to efficiently transfer data having significantly different data rates, such as voice, computer data, video services, and so forth.

The increasing demand for high and varying data rate communications services, such as TV conference, video information retrieval, or computer data transfer, has created a need for a switching technology that can meet the higher and varying data rates of such broadband services. ATM switching technology is desirable because it offers an acceptable compromise in combining timeliness characteristics (normally associated with circuit switching technologies) and statistical advantages (associated with packet switching technologies). Thus, ATM holds out the prospect of a single transfer mode technology for carrying all traffic types, including voice, entertainment services, or computer traffic.

One component of the ATM network is a core switch system. The core switch system is responsible for switching high traffic volumes, i.e., many data streams of ATM data cells associated with many virtual circuits. This switch typically multiplexes multiple access switches into higher rate paths, such as OC-48 rates (2.5 gigabits per second). The core switch system then is responsible for switching many ATM data streams that may have data rates of 2.5 gigabits per second and higher.

Some conventional ATM switching products include 8×8 (eight input by eight output) or 16×16 (sixteen input by sixteen output) single stage switch fabrics. These conventional ATM switching products are typically capable of switching input data streams having data rates at either 155 megabits per second or 622 megabits per second. Unfortunately, the conventional single-stage 8×8 and 16×16 switch fabrics are unable to meet the demands of high data rates and a large number of input-output ports.

In order to increase the number of input-output ports in a switch system, some prior art switch systems incorporate smaller single stage switch fabrics into a multi-stage switch system. Unfortunately, the larger multi-stage switches pose unique problems of interconnectability due to the geometrical increase in hardware cost as the number of input and output ports is increased. The problems associated with interconnection of multiple switch fabrics to form a larger multi-stage switch configuration are: input/output transmission delay variation between the switching fabrics speed degradation, crosstalk, signal path impedance, supply voltage distribution, power dissipation, switch size, and higher cost. These problems are exacerbated by the high data rates of the ATM data streams.

In addition, switching system speed and physical configuration are limited by conventional off-fabric interconnection technology. For example, the conventional ATM switching products use either fiber optical cable, coaxial, or twisted pair cable to interconnect circuit cards within a switch system. This scheme works well for conventional 8×8 or 16×16 switch fabrics in which only a few data streams are routed to a common switching fabric module. However, this scheme does not accommodate terminating a much larger number of input-output ports due to limitations in connector size, and the size and quantity of interconnecting cables. In other words, a limiting factor in conventional switching systems is the volume of interconnects to a common switching fabric module. Larger switching fabric modules will need to accommodate many more interconnects than can be accommodated in conventional switching systems.

In order to effectively switch data streams, switching systems must operate synchronously. In other words, individual cells of the ATM data streams must be clocked into the switch fabric at the same time. Differing propagation delays due to differing cable lengths between circuit cards and traces on circuit cards prevent this synchronous clocking and switching of the cells.

This problem is circumvented in conventional switch fabrics by making the interconnecting cables the same length and by making traces on the circuit cards of equal lengths. Thus, the propagation delay is the same for all of the ATM input data streams and synchronous arrival of data cells is achieved. However, this scheme also does not economically accommodate the transmission of a much larger number of input-output data streams. The increased quantity of cabling and the circuitous trace layout on the circuit cards significantly increase switch system size and complexity and adversely affect system performance and cost.

Future broadband video services will supply thousands of subscribers with a wide selection of channels. The number of required channels is especially high with video-on-demand and point-to-point video services. These broadband services will require large switches with hundreds or thousands of input-output ports. In addition, as with any service, customer satisfaction is a prime concern thus high quality call connections with little cell loss and high probability for call completion are of significant concern. So, these large switches will desirably provide broadcasting capability while exhibiting very low blocking.

Thus, what is needed is a single stage switch system capable of switching a large number of high speed input data streams. Furthermore, what is needed is a switch system that is non-blocking. In addition, what is needed is an apparatus that is readily miniaturized, highly reliable, and low cost.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

The present invention provides, among other things, a system and method for precompensation of signals to arrive at a specific location (e.g., the switching fabric) at substantially the same time. In the preferred embodiment, the signals from I/O cards are precompensated to arrive at the switch fabric on the same clock cycle. Prior techniques achived this, for example, by making path lengths identical.

Figure 1:
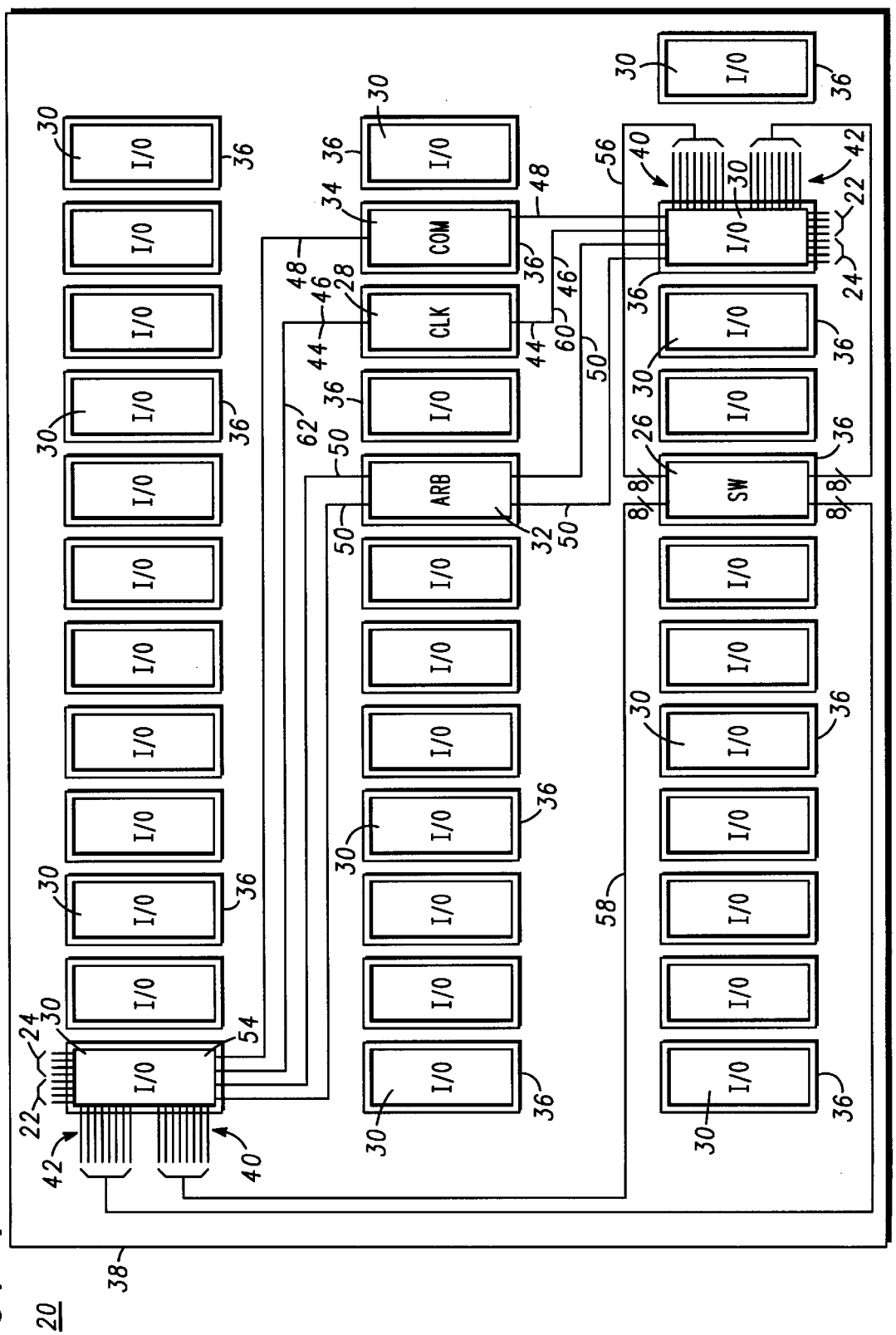
FIG. 1 shows a block diagram of a switch system in accordance with a preferred embodiment of the present invention.

FIG. 1 shows a block diagram of a switch system 20 in accordance with a preferred embodiment of the present invention. Switch system 20 is configured to switch a plurality of asynchronous transfer mode (ATM) input data streams 22 to a plurality of ATM output data streams 24.

Switch system 20 includes a single stage space switch card (SW) 26, a clock circuit card (CLK) 28, input/output circuit cards (I/O) 30, an arbiter card (ARB) 32, and a controller card (CON) 34, all of which are mounted in discrete slots 36 in a backplane assembly 38. The preferred embodiment includes thirty-two I/O circuit cards 30, each of which receives four of ATM input data streams 22 and outputs four of ATM output data streams 24 resulting in a total of 128 ATM input data streams 22 and 128 ATM output data streams 24.

A plurality of data transmission lines are integral to backplane assembly 38. Input data transmission lines 40 couple each of I/O circuit cards 30 to single stage space switch card 26 for transmitting ATM input data streams 22 from I/O circuit cards 30 to switch card 26. Likewise, output data transmission lines 42 couple single stage space switch card 26 to each of I/O circuit cards 30 for transmitting ATM output data streams 24 from switch card 26 to I/O circuit cards 30. Backplane assembly 38 also includes integral clock transmission lines 44 coupled between clock circuit card 28 and each of I/O circuit cards 30 for transmitting a clock signal 46 to each of I/O circuit cards 30. In addition, controller transmission lines 48 are coupled between controller card 34 and I/O circuit cards 30, and arbiter transmission lines 50 are coupled between arbiter card 32 and I/O circuit cards 30.

In the preferred embodiment, clock signal 46 output by clock circuit card 28 is approximately 750 MHz. Clock signal 46 is used to clock data streams out of and into I/O circuit cards 30 and through single stage space switch 26 as will be explained in greater detail below.

Input data transmission lines 40, output data transmission lines 42, clock transmission lines 44, controller transmission lines 48, arbiter transmission lines 50 are conductive traces desirably imbedded, perhaps using multiple layers in a printed circuit board implementation of backplane assembly 38 using conventional printed circuit board fabrication techniques. Data transmission lines are coupled between all of I/O circuit cards 30 and the other circuit cards as previously described. However, for clarity of illustration, the transmission lines for a first I/O circuit card 52 and a second I/O circuit card 54 are shown.

The printed circuit board implementation of backplane assembly 38 removes the need for optical, twisted pair, or coaxial cabling between switch stages and input/output modules. In addition, the printed circuit board implementation includes a large numbers of traces and allows for a high density of interconnects so that many data streams may be accommodated for switching. Thus, the printed circuit board implementation of backplane assembly 38 decreases the size of switch system 20 over conventional switch systems, and at the same time enables the switching of a higher number of data streams.

FIG. 1 illustrates input data transmission lines 40 for first I/O circuit card 52 as being described by a first input transmission path 56 and input data transmission lines 40 for second I/O circuit card 54 as being described by a second input transmission path 58. The path length of each of first and second input transmission paths 56 and 58, respectively, is determined by the slot location of first and second input circuit cards 52 and 54, respectively, relative to the slot location of single stage space switch card 26. In the preferred embodiment, there is no requirement for transmission path lengths between I/O circuit cards 30 and switch card 26 to be equal. First and second input transmission paths 56 and 58, respectively, have different path lengths. As a result, the propagation time delays along each of first and second input transmission paths 56 and 58 will be different.

Clock transmission lines 44 for first I/O circuit card 52 are described in FIG. 1 by a first clock transmission path 60 and clock transmission lines 44 for second input circuit card 54 are described by a second clock transmission path 62. The path length of each of first and second clock transmission paths 60 and 62, respectively, is determined by the slot location of first and second input circuit cards 52 and 54 relative to the slot location of clock circuit card 28. In the preferred embodiment, there is no requirement for transmission path lengths between I/O circuit cards 30 and clock circuit card 28 to be equal. First and second clock transmission paths 60 and 62, respectively, have different path lengths. As a result, the propagation delays along each of first and second clock transmission paths 60 and 62 will be different.

Each of ATM input data streams 22 has a synchronous optical network (SONET) data rate of at least 155 megabits per second and a data rate of approximately 2.5 gigabits per second in the preferred embodiment. Likewise, each of ATM output data streams 24 has this same rate. Furthermore, switch system 20 is a non-blocking switch system configured to input 128 ATM input data streams 22 and output 128 ATM output data streams 24.

Figure 2:
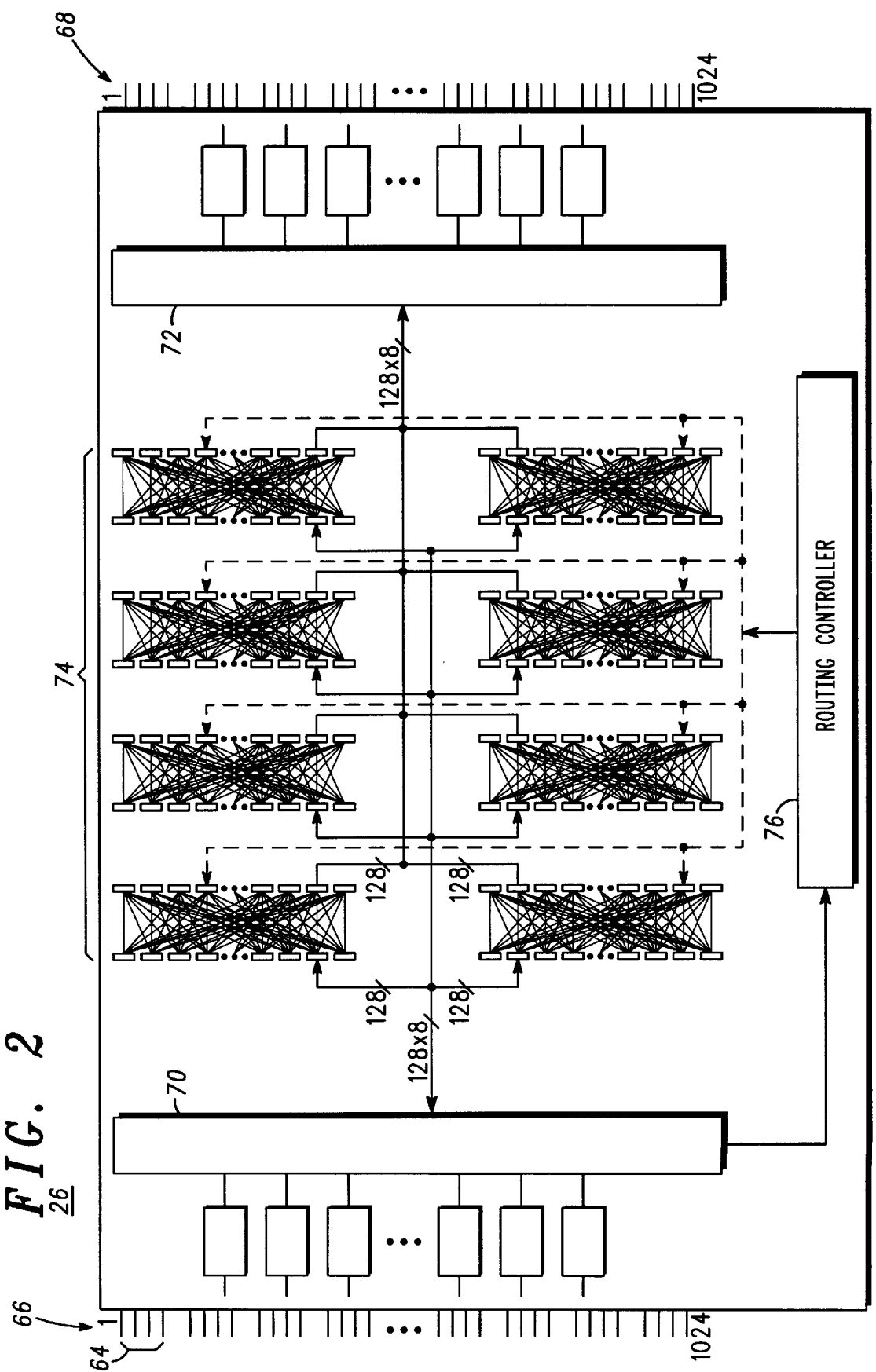
FIG. 2 shows a block diagram of a single stage space switch circuit card of the switch system in accordance with a preferred embodiment of the present invention.

FIG. 2 shows a block diagram of single stage space switch circuit card 26 of switch system 20 in accordance with a preferred embodiment of the present invention. Single stage space switch circuit card 26 is configured to switch at least sixty-four of ATM input data streams 22 to at least sixty-four output data streams 24 at a data throughput of at least 160 gigabits per second. In the preferred embodiment, space switch circuit card 26 is an application specific integrated circuit (ASIC) configured to switch 128 of ATM input data streams 22 to 128 of ATM output data streams 24 for a data throughput of approximately 320 gigabits per second.

In order to accomplish this high data throughput, the interface between space switch 26 and I/O circuit cards 30 is preferably implemented using low voltage differential signaling (LVDS) semiconductor components, although other technologies are also suitable. LVDS technology is a low swing, differential signaling technology which allows single channel data transmission at hundreds of megabits per second (Mbps). Its low swing and current mode driver outputs create low noise and low power consumption at high frequencies. In addition, the differential data transmission method used in LVDS technology is less susceptible to common-mode noise than single-ended schemes. However, LVDS signals are differential signals. That is, each signal is conveyed using two transmission lines. The use of two transmission lines to convey each signal exacerbates the problem of routing numerous input and output data transmission lines 40 and 42 (FIG. 1) between I/O circuit cards 30 (FIG. 1) and switch card 26 (FIG. 1).

Moreover, in order to switch ATM input data streams 22 having 2.5 gigabit per second data rates, each single ATM input data stream 22 is demultiplexed into four parallel data sub-streams 64. This allows parallel switching of four-bit nibbles of data at a lower clock speed than would be required to achieve the same effective switching rate using non-parallel switching. This slower clock speed is desirably the maximum speed supported by the components in which switch card 26 is implemented.

The use of these parallel, differential switching paths requires many interconnections at switch card 26. In order to switch 128 ATM input data streams 22 (512 of parallel data sub-streams 64), switch card 26 is configured with 1024 switch inputs 66 and 1024 switch outputs 68. The use of a printed circuit card backplane assembly 38 (FIG. 1) accommodates this density of interconnects at switch card 26, that conventional optical, coaxial, and twisted pair interconnect techniques do not.

An input latching register component 70 is coupled to switch inputs 66 for processing parallel data streams 64, and an output latching register component 72 is coupled to switch outputs 68. Additionally, a non-blocking switch fabric 74 is coupled between input latching register component 70 and output latching register component 72. A routing controller 76 is configured to direct ATM data cells of parallel data sub-streams 64 from switch inputs 66 to input latching register component 70, through multiplexer array 74, to output latching register component 72 and subsequently to switch outputs 68. In addition, a clock line (not shown) is coupled between single stage switch card 26 and clock circuit card 28 for transmission of clock signal 46 to switch card 26.

In operation, signals from every one of the 1024 switch inputs 66 (four differentially conveyed bits for each of the 128 ATM input data streams 22) are latched into input register component 70 each clock cycle. In the preferred embodiment, a clock cycle is approximately 1.33 nanoseconds (nsec). In addition, 512 bits of data are latched out of input latching register component 70 each clock cycle. Thus, multiplexer array 74 receives and switches 512 differentially conveyed bits of data over the 1024 cross-points of switch fabric 74 each switching event. Following the switching operation, the 1024 bits are latched into and out of output latching register component 72.

In order for synchronous switching to occur at single stage space switch 26, each of the ATM data cells of parallel data sub-streams 64 desirably arrive at switch inputs 66 at the same instants in time so as to be clocked into input register component 70 at instants in time defined by the clock signal, i.e., substantially synchronously. At the 750 Mbps clock signal 46, the transmit time of a single bit of data is approximately 1.33 nanoseconds, which represents the propagation delay introduced by traveling along approximately only ten inches of transmission line. Parallel data sub-streams 64 are desirably synchronized to within a fraction of this cycle time for clock signal 46.

The printed circuit board implementation of backplane assembly 38 produces data and clock transmission lines 40 and 44, respectively, that have differing path lengths. Likewise, nothing requires equal length transmission lines for similar signals within I/O cards 30 and switch card 26. These differing path lengths results in differing propagation delays and adversely affects the synchronous arrival of ATM data cells at switch inputs 66.

While propagation delay associated with data transmission exists in prior art fiber optical, coaxial, and twisted pair systems, it is not a factor since cables in the prior art systems are made of equal length, thus negating the problems associated with different signal propagation delays. Likewise, great care is exercised in laying out switches and I/O cards in prior art systems to insure equal length intra-card paths. However, the use of equal-length cabling and restricting layout constraints are highly undesirable when large numbers of signals interconnect at a common switching card.

Figure 3:
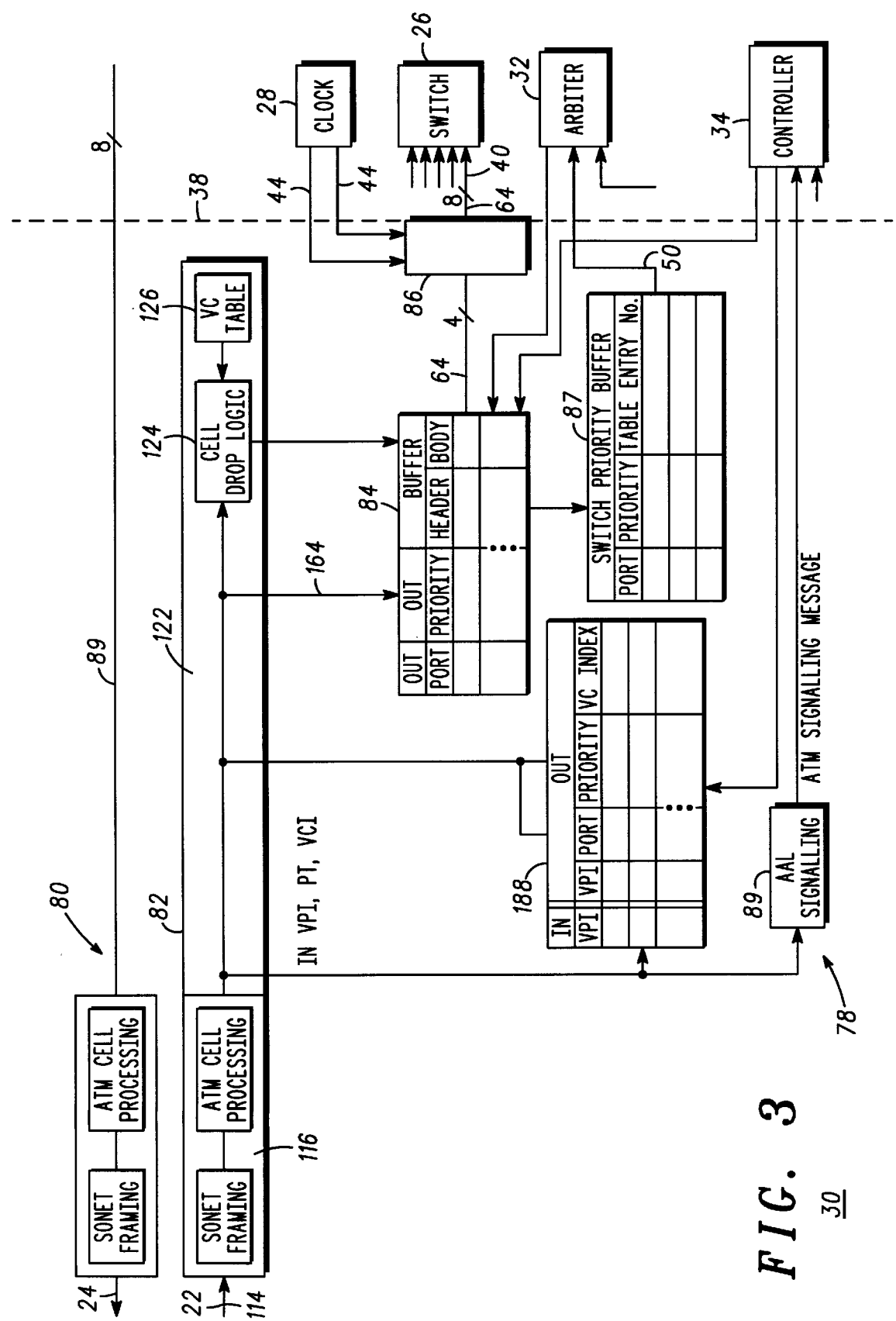
FIG. 3 shows a block diagram of an input circuit card of the switch system in accordance with a preferred embodiment of the present invention.

FIG. 3 shows a block diagram of an I/O circuit card 30 in switch system 20 in accordance with a preferred embodiment of the present invention. I/O circuit card 30 is configured to compensate for the differing propagation delays introduced to the system in response to the different path lengths of clock transmission lines 44 and input data transmission lines 40 so that parallel data sub-streams 64 representative of ATM input data streams 22 arrive at single stage space switch 26 substantially synchronously. All I/O circuit cards 30 are desirably identical for ease of manufacturing and inventory, although this is not a requirement of the present invention.

Input circuit card 30 includes four input modules 78 and four output modules 80. Each of input modules 78 is configured to receive one of ATM input data streams 22. Likewise, each of output modules 80 is configured to output one of ATM output data streams 24. For clarity of description, only one of input modules 78 and output modules 80 will be described, although it should be readily apparent to those skilled in the art, that the following discussion applies to all of input modules 78 and output modules 80 on each of I/O circuit cards 30.

Input module 78 includes an input interface circuit 82 configured to receive one of ATM input data streams 22. Input interface circuit 82 is coupled to a buffer 84 and a timing compensation element 86 coupled to buffer 84. In addition, a switch priority buffer 87 is coupled to buffer 84 and communicates with arbiter card 32. A routing table 88 and an ATM Adaptive Layer (AAL) signaling component 89 are coupled to interface circuit 82 and communicate with controller circuit card 34.

Timing compensation element 86 is coupled to clock circuit card 28 by clock transmission lines 44. In addition, timing compensation element 86 is adapted to output a predetermined number of bits (i.e. four in the preferred embodiment) of parallel data sub-streams 64 as differential signals on eight input data transmission lines 40. These eight input data transmission lines 40 are subsequently coupled to eight of switch inputs 66 (FIG. 2) of single stage space switch 26 (FIG. 2).

Correspondingly, output module 80 is configured to receive a single four bit, differentially conveyed parallel data sub-stream (not shown) from eight of switch outputs 68 (FIG. 2) of space switch 26 (FIG. 2) over eight output transmission lines 42, and will not be described in detail herein.

Figure 4:
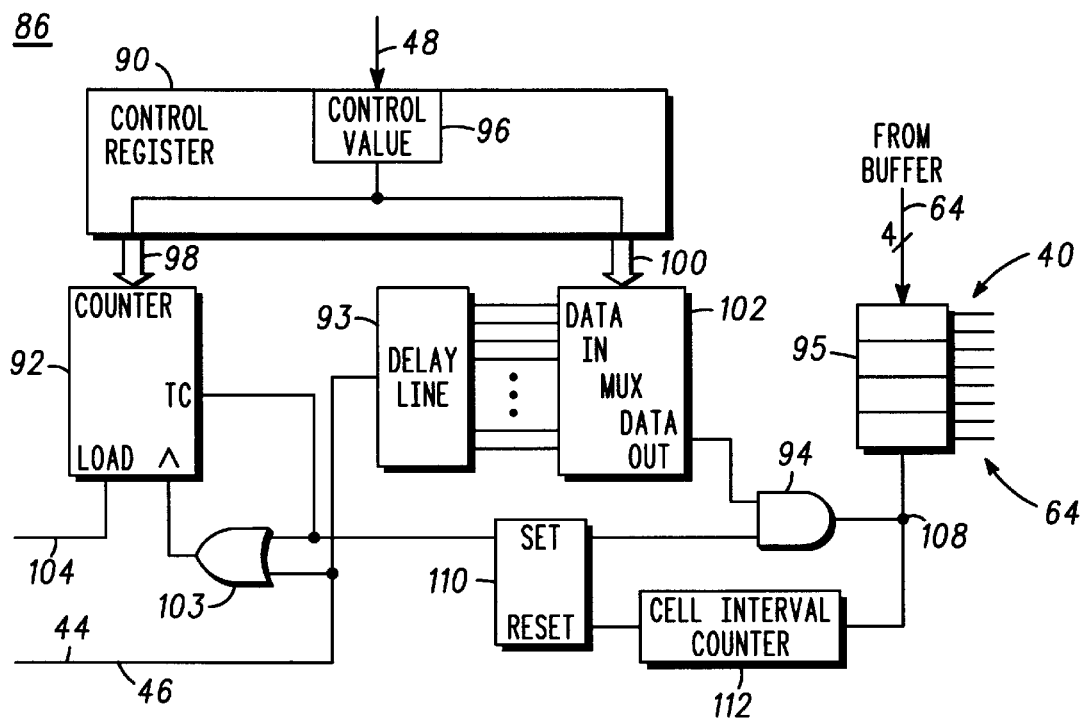
FIG. 4 shows a block diagram of a timing compensation element of the input circuit card in accordance with a preferred embodiment of the present invention.

FIG. 4 shows a block diagram of timing compensation element 86 of input module 78 in accordance with a preferred embodiment of the present invention. Timing compensation element 86 is configured to impart a time delay to parallel data sub-streams 64 relative to the path lengths of clock transmission lines 44 and ATM input data transmission lines 40. Timing compensation element 86 includes a control register 90 coupled to controller card 34 (FIG. 3) by controller transmission line 48. Control register 90 is in data communication with a settable counter 92 and a settable delay line 93. Time delay signals (described below) from outputs of each of counter 92 and delay line 93 are combined at an AND gate 94. Additionally, an output of AND gate 94 is coupled to an output register 95 for clocking parallel data sub-streams 64 out of output register 95 in response to the time delay signals from counter 92 and delay line 93.

Clock signal 46 is subject to propagation delays that are proportional to the clock path length of clock transmission line 44 to input circuit module 78 of input circuit card 30. In other words, the time it takes clock signal 46 to reach a specific one I/O circuit cards 30 depends upon its location in backplane assembly 38, thus clock signal 46 arrives asynchronously at each of I/O circuit cards 30 relative to the 1.33 nanosecond clock cycle time used in the preferred embodiment. Likewise, parallel data sub-streams 64 are subject to propagation delays that are proportional to the data path length of input data transmission lines 40 from input circuit card 30 to single stage space switch 26.

The propagation delay caused by the clock path length of clock transmission line 44 affects when ATM data cells of parallel data streams 64 are clocked out of I/O circuit cards 30. In addition, the propagation delay caused by the data path length of the input data transmission lines 40 affect when ATM data cells arrive at single stage space switch 26. Since clock transmission line 44 and input data transmission lines 40 are conductive traces within backplane assembly 38 (FIG. 1) with known path lengths, control value 96 can be predetermined and programmed in control register 90 of input module 78 prior to operation of switch system 20. In addition, due to the differing path lengths, differing input modules 78 of I/O circuit cards 30 have different control values 96.

Control value 96 may be calculated by controller 34 prior to switch operation by measuring the path lengths of clock transmission line 44 and input data transmission lines 40 and determining an expected propagation delay based on the 1.33 nanosecond clock cycle of clock signal 46. Control value 96 may then be tested under real data transmission conditions and then be adjusted accordingly by controller 34 until control values 96 for each of I/O circuit cards 30 are determined that cause synchronous arrival of ATM input data streams 22 at switch card 26. Controller 34 then communicates control value 96 to control register 90.

In the preferred embodiment, controller card 34 is configured to predetermine a control value 96 representative of the desired time delay and program control value 96 into control register 90. However, those skilled in the art will recognize that timing compensation element 86 may set itself from a table of known time delays (not shown), or that timing compensation element 86 may be configured by hard wiring, or that the slot 36 into which an I/O card 30 is plugged may be wired to specify control value 96.

Control value 96 includes an integral value 98 and a fractional value 100 that are combined at an AND gate 94 to delay clock signal 46. Integral value 98 defines an integral multiple number of clock cycles of the 750 MHz clock signal 46. In other words, integral value 98 is an integral multiple of the approximately 1.33 nsec clock cycle. Fractional value 100 is a fraction of the approximately 1.33 nsec clock cycle. Integral value 98 is communicated to counter 92 to set counter 92 and fractional value is communicated to a multiplexer 102 in association with delay line 93 to set multiplexer 102.

In order to accomplish synchronous arrival of parallel data sub-streams 64 at single stage space switch 26, each of parallel data sub-streams 64 is desirably aligned such that the start of each of the ATM data cells from each of the 128 ATM input data streams 22 arrives at single stage space switch 26 substantially concurrently. Due to propagation delays along clock and data transmission lines, however, an ATM data cell may be delayed by more than one clock cycle. Thus, the time delay to be imparted on different ones of parallel data sub-streams 64 may be delayed by an integral multiple and a fractional component of a clock cycle.

Counter 92 is enabled by a sync signal 104. Sync signal 104, which may be transmitted on clock transmission lines 44 (FIG. 1) to counter 92, informs timing compensation element 86 of the start of each ATM data cell of ATM input data stream 22 from the time frame of clock card 28 (FIG. 1) so that the start of ATM data cells are aligned when each of the ATM data cells arrive at single stage space switch 26. In response to sync signal 104, counter 92 is configured to delay clock signal 46 by an amount of time equivalent to integral value 98. In addition, in response to sync signal 104, delay line 93 in conjunction with multiplexer 102 delays clock signal 46 by an amount of time equivalent to fractional value 98. The integral component and the fractional component of the time delay are combined at AND gate 94 to produce a delayed clock signal 108. Those skilled in the art will recognize that delayed clock signal 108 has different timing for differing ones of I/O circuit cards 30.

In response to counter 92 counting to integral value 98, a flip-flop 110, coupled to counter 92 and OR gate 103, is set in order to indicate the cycle of clock signal 46 in which a cell should begin to arrive synchronously at switch card 26 with other cells. A cell interval describes the duration of a fixed-size ATM data cell. Flip-flop 110 is reset at the end of each cell interval by a cell interval counter 112. Sync signal 104 may be controlled so that flip-flop 110 gets set at substantially the same instant that it is also reset so that there is little or no inter-cell timing gap produced by system 20.

With reference back to FIG. 3, the flow of an ATM data cell 114 in one of ATM input data streams 22 (FIG. 1) through switch system 20 will be described. Each of ATM input data streams 22 includes a plurality of fixed-size ATM data cells 114. Each ATM data cell contains a forty-eight octet payload field and a five octet header field. The payload field contains the cell data to be switched, while information in the header field identifies the virtual circuit for the ATM data cell. The virtual circuit is the logical communication path between sending and receiving network end systems for a call (voice, data, video, etc.). Thus, all ATM data cells associated with one call will have the same virtual circuit, although the physical path of each cell 114 through switch nodes of the communications network may be different.

The path that each cell 114 takes is described as a virtual path and may include switching through the switch fabric at switch nodes. In accordance with the preferred embodiment of the present invention, each cell 114 may take a different path through the switch fabric. However cells having the same virtual path identifier are transferred from the same input port to the same output port independent of the path taken through the switch fabric. A virtual path identifier describes a node-to-node path for a single ATM data cell and different ATM data cells of the same virtual circuit may be described by a different virtual path identifier.

While the flow of a single ATM data cell 114 through switch system 20 will be described, it should be readily apparent to those skilled in the art that each of I/O circuit cards 30 concurrently processes streams of ATM data cells from ATM input data streams 22.

Input interface circuit 82 includes interface circuit 116 configured to receive ATM data cell 114. Interface circuit 116 is preferably a SONET interface circuit, althogh other technology may be suitable. At interface circuit 116, ATM data cell 114 passes through framing (e.g., SONET Framing) and ATM Cell Processing blocks in which the pre-existing ATM header information is anaylzed. Per convention, invalid ATM data cells may be discarded, and an error indication is preferably sent to controller 34.

In addition, interface circuit 116 examines the header field of ATM data cell 114 to determine an incoming virtual path identifier (In VPI) and a payload type (PT) for ATM data cell 114. The incoming VPI identifies the path that ATM data cell 114 took to the input port (not shown) of input module 78. The payload type indicates whether ATM data cell 114 is a signaling type cell or a data type cell.

When ATM data cell 114 is a valid signaling type, interface circuit 116 transmits the incoming VPI, the PT, and a virtual circuit identifier (VCI) for the virtual circuit of ATM data cell 114 to AAL signaling component 89. AAL signaling component 89 assembles the conventional ATM Network Node Interface (NNI) signaling message used for path setup/teardown, and routes the ATM NNI signaling message to controller 34.

Controller 34 is responsible for controlling all virtual path establishments and terminations for switch system 20. The NNI messages from AAL signaling component 89 are processed by controller 34. When a request for service is received, controller 34 examines the request for resources (outputs 68, see FIG. 2), determines what resources are available in space switch 26 (FIG. 2), and either responds with an "insufficient resources" message to the requester, or populates routing table 88 of input module 78 to match incoming virtual path identifier (In VPI) for ATM data cell 114 to an output port (not shown) of one of output modules 80 (OUT PORT) and a outgoing virtual path identifier (OUT VPI) for switching through space switch 26.

In addition, in a preferred embodiment, controller 34 assigns a switching priority to ATM data cell 114 and populates routing table 88 with the switching priority (PRIORITY) for ATM data cell 114. Factors that may affect switching priority may include order of arrival at input module 78, data type, virtual circuit, and so forth. In the preferred embodiment, system 20 will attempt to switch ATM data cells having a higher switching priority prior to switching ATM data cells having a lower switching priority.

In connection with the path establishment activities, for data type cells, a cell priority determiner element 122 coupled between SONET interface circuit 116 and buffer 84 further defines the assigned switching priority for ATM data cell 114. In addition, cell priority determiner 122 includes a cell drop logic circuit 124. Cell drop logic circuit 124 checks the cell loss priority bit in the header field of ATM data cell 114 to determine if the data cell 114 is to be dropped. In an alternative embodiment, cell drop logic circuit 124 checks the cell loss priority bit to determine if the switching priority for ATM data cell 114 is to be decreased. A virtual circuit (VC) table 126 is used by cell drop logic circuit 124 to indicate which virtual circuit ATM data cell 114 is associated with.

The cell loss priority bit is set by "upstream" switches, or nodes, prior to arriving at input module 78 when the sending switch exceeds it's allocated bandwidth. In other words, for ATM data cells having the same virtual circuit as ATM data cell 114, when the sending switch "upstream" exceeded its bandwidth allocation, the loss priority bit will be set.

In the preferred embodiment, when the cell loss priority bit is set for an ATM data cell, the switching priority for that ATM data cell, and all other subsequent ATM data cells associated with that virtual circuit may be dropped (or in an alternative embodiment, decreased) since some ATM data cells having the same virtual circuit of ATM data cells 114 were previously flagged as being candidate cells for being dropped by an upstream switch. This prioritization scheme limits the number of virtual circuits that are experiencing dropped ATM data cells as opposed to ATM data cells being dropped from multiple virtual circuits. Thus, this prioritization scheme increases overall user satisfaction by increasing the number of successful and reliable call communications links.

Those skilled in the art will recognize that as part of the prioritization scheme previously discussed, when more than one of ATM input data streams 22 is requesting the same ones of outputs 68 at a given time in single stage space switch 26 and the cell loss priority bit is set for an ATM data cell of one of ATM input data streams 22, that ATM data cell, and all other ATM data cells associated with that virtual circuit may be dropped prior to being entered into buffer 84 thus saving buffer space and processing time.

ATM data cell 114 is stored in buffer 84 in association with the assigned output port (PORT), switching priority (PRIORITY), and additional header information (HEADER) describing the output VPI through single stage space switch 26. In the preferred embodiment, the conventional 53 byte ATM data cell is augmented with 11 bytes of new header information (HEADER) to produce a 64 byte data cell. These additional bytes may be removed before ATM cell 114 is output from switching system 20. HEADER describes the switching of the four bits of differential data corresponding to four bits from parallel data sub-streams 64 of ATM data cell 114 from switch inputs 66 (FIG. 2) to switch outputs 68 (FIG. 2). Thus, at the 750 MHz clock rate of clock signal 46, the cell interval for the 64 byte ATM data cell is approximately 170.4 nsec.

Switch priority buffer 87 of input module 78, in communication with buffer 84, selects the highest priority ATM data cells residing in buffer 84 of input module 78. Cell identities for the highest priority ATM data cells are sent to arbiter 32 over one of arbiter transmission lines 50 a few cells in advance of when actual switching for the identified cell will occur. The cell identity includes an output VPI, output port, and a table entry number which refers to ATM data cell 114 in buffer 84.

In the preferred embodiment, switching priority buffer 128 selects the cell identities for the four ATM data cells having the highest switching priorities. Four cell identities are sent to arbiter 32 to alleviate a head-of-line blocking characteristic of input buffered switch architectures. Head-of-line blocking occurs when an ATM cell cannot be switched because the desired output port is in use and that ATM cell prevents any following ATM cells in that buffer from being switched. Those skilled in the art will recognize that any reasonable number of cell identities may be sent to arbiter 32.

Figure 5:
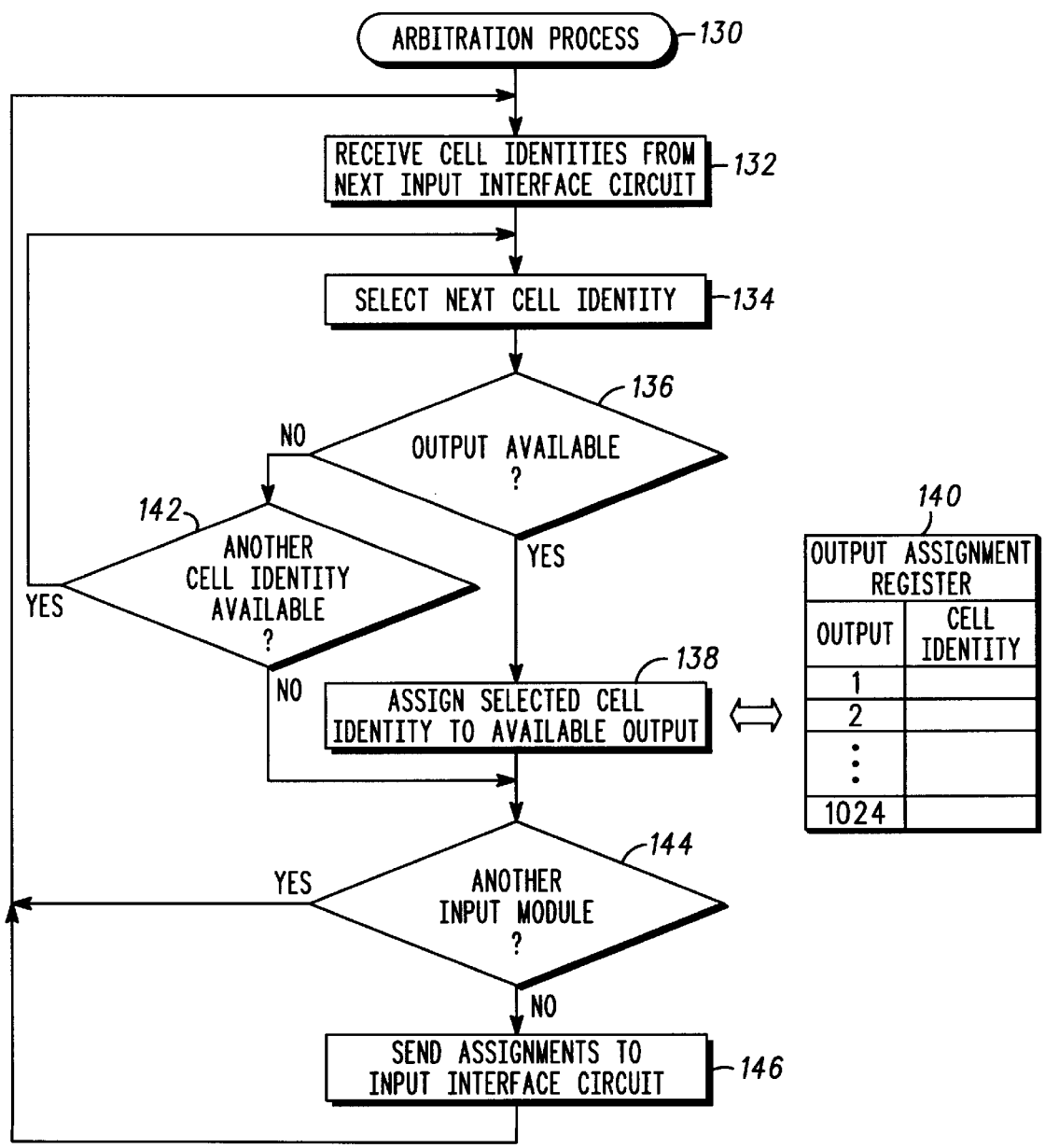
FIG. 5 shows a flow chart of an arbitration process in accordance with a preferred embodiment of the present invention.

FIG. 5 shows a flow chart of an arbitration process 130 in accordance with a preferred embodiment of the present invention. Process 130 is performed by arbiter circuit card 32 (FIG. 1) for output contention resolution between all of input modules 78 of all of I/O circuit cards 30 (FIG. 1).

Process 130 begins with a task 132. In task 132, arbiter card 32 receives cell identities for the ATM data cells selected in input switch priority buffer 128 of a specific one of input modules 78.

Following receipt of cell identities in task 132, a task 134 is performed. Task 134 selects one of the received cell identities for evaluation.

In conjunction with task 134, a query task 136 causes arbiter card 32 to determine if the desired outputs 68 (FIG. 2) are available for output assignment. When the desired outputs 68 are available, process 130 proceeds to a task 138. As described previously, ATM data cell 114 is demultiplexed into four parallel data sub-streams 64 (FIG. 3) which are transmitted as differential signals on eight of input data transmission lines 40. Thus, arbiter 32 arbitrates the assignment of output ports where each port uses eight of outputs 68 to switch ATM data cell 114 to an output module 80 (FIG. 3) of I/O circuit cards 30.

Task 138 causes arbiter 32 to assign the selected cell identity for a selected one of ATM data cells to the desired output port. The cell identity assignment is recorded in an output assignment register 140 of arbiter 32. Output assignment register 140 associates the cell identity with the assigned switch output port so that the assigned switch output port cannot be reassigned to another cell identity from another one of input modules 78.

When query task 136 determines that the desired switch outputs 68 corresponding to an output module 80 are not available, process 130 proceeds to a query task 142. Query task 142 cause arbiter 32 to determine if another cell identity is available from cell identities in switch priority buffer 128 for the current input module 78.

When another cell identity is available in task 142, program control loops back to task 134 to determine if the ATM data cell associated with that cell identity can be assigned to a second output port. Thus, arbiter 32 evaluates the cell identities from one of input modules 78, individually until an ATM data cell associated with one of the cell identities can be assigned to a free switch output port, or until there are no further selections available from the one input module 78.

When another cell identity is not available in task 142 or after task 138 assigns an ATM data cell associated with a selected cell identity to an available switch output port, process 130 proceeds to a query task 144. Query task 144 determines if there is another one of input modules 78 for which cell identities from another switching priority buffer 128 are to be evaluated.

When arbiter 32 determines in query task 144 that another input module 78 is available, program control loops back to task 132 to begin the assignment process for another one of input modules 78. Query task 144 causes arbiter 32 to evaluate cell identities from each input module 78, individually, to attempt to assign an ATM data cell from each of input modules 78 to switch output ports. Thus, arbitration process 130 efficiently maximizes the switching capability of single stage space switch 26 by minimizing head-of-line blocking.

When arbiter 32 determines in query task 144 that there is not another input module 78 available for evaluation, process 130 proceeds to a task 146. Task 146 causes arbiter 32 to send cell identities for output assignments from output assignment register 140 to input modules 78.

Following task 146, program control loops back to task 132 to begin arbitration process 130 for the next cell interval. Process 130 is ongoing as long as switch system 20 is in operation and may take a few cell intervals to complete. However, process 130 may be implemented in a parallel, pipelined fashion to achieve a throughput of one assignment set for output ports per cell interval. Those skilled in the art can devise numerous hardware and/or software cards to perform process 130 or its equivalent. Moreover, those skilled in the art will recognize that there are any number of ways to arbitrate assignment of output ports and promote fairness in output assignment.

With reference back to FIG. 3, the cell identity for the selected one of ATM data cells is sent to buffer 84 of input module 78 to determine which ATM data cell is to be output from buffer 84 to single stage space switch 26 in the next cell time slot.

When ATM data cell 114 is selected by arbiter 32 to be passed to single stage space switch 26, ATM data cell 114 is clocked out of buffer 84 as parallel data sub-streams 64 and stored in output register 95 of timing compensation element 86 (FIG. 4). Parallel data sub-stream 64 is output from output register 95 on eight of input data transmission lines 40 at a rate of one four-bit nibble of parallel data per cycle of delayed clock signal 108 (FIG. 4).

Those skilled in the art will recognize that each of input modules 78 will output a four-bit nibble of an ATM data cell each clock cycle. The four-bit nibble will be output from each of input modules 78 asynchronously, in response to different ones of delayed clock signals 108. However, due to the time delay imparted on each of the ATM data cells from each of ATM input data streams 22 by delayed clock signal 108, each four bit nibble will arrive at switch inputs 64 (FIG. 2) of switch fabric 26 substantially synchronously.

Figure 6:
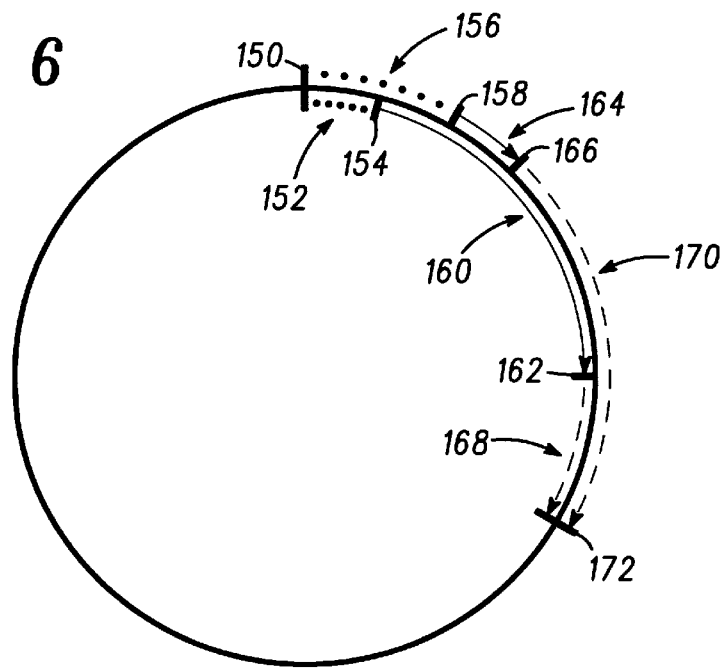
FIG. 6 shows a timing chart of time delays imposed on the transmission of data streams in the switch system in accordance with a preferred embodiment of the present invention.

FIG. 6 shows a timing chart 148 of time delays imposed on the transmission of ATM input data streams 22 in switch system 20 in accordance with a preferred embodiment of the present invention. Timing chart 148 is used to illustrate the asynchronous activities occurring at I/O circuit cards 30 in response to path lengths of clock transmission lines 44 and input data transmission lines 44. The following description of timing chart 148 can best be understood by referring to switch system 20 illustrated in FIG. 1.

A first tick mark 150 indicates the occurrence of the sync signal 104 (FIG. 4) component of clock signal 46 output by clock circuit card 28. Sync signal 104 is transmitted over first clock transmission path 60 to first input circuit card 52. A first dotted line 152 indicates the propagation delay imparted on sync signal 104 in response to the length of first clock transmission path 60. A second tick mark 154 indicates when sync signal 104 is received by counter 92 (FIG. 4) of a first timing compensation element 86 of first input circuit card 52.

In addition, sync signal 104 is transmitted over second clock transmission path 62 to second input circuit card 54.

A second dotted line 156 indicates the propagation delay imparted on sync signal 104 in response to the length of second clock transmission path 62. A third tick mark 158 indicates when sync signal 104 is received by counter 92 of a second timing compensation element 86 of second input circuit card 54.

Following receipt of sync signal 104 by first input circuit card 52, a first delayed clock signal 108 (FIG. 4) is produced by first timing compensation circuit 86 to impart a first delay on a first one of input data streams 22. A first solid line 160 indicates the first delay imparted on an ATM cell from the first one of input data streams 22. A fourth tick mark 162 indicates the instant at which the first four-bit nibble of this cell from the first one of input data streams 22 is transmitted from I/O card 52 to single stage space switch 26.

Likewise, following receipt of sync signal 104 by second input circuit card 54, a second delayed clock signal 108 (FIG. 4) is produced by second timing compensation circuit 86 to impart a second delay on a second one of input data streams 22. A second solid line 164 indicates the second delay imparted on an ATM cell from the second one of input data streams 22. A fifth tick mark 166 indicates the instant at which the first four-bit nibble of this cell from the second one of input data streams 22 is transmitted from I/O card 54 to single stage space switch 26. Durations 160 and 164 are unequal to compensate for unequal propagation delays imposed on similar signals from different I/O cards 30.

A first dashed line 168 indicates the propagation delay imposed on the transmission of the ATM cell, including the cell's first four bit nibble, from the first one of input data streams 22 in response to the length of first data transmission path 56. Likewise a second dashed line 170 indicates the propagation delay imposed on the transmission of the cell, including the cell's first four bit nibble, from the second one of input data streams 22 in response to the length of second data transmission path 58. A bar 172 indicates the synchronous arrival of the first and subsequent four bit nibbles of the first and second ones of input data streams 22 at switch inputs 64 (FIG. 2) of single stage space switch 26.

The circumference of timing chart 148 indicates the duration of an entire cell (e.g. 170.4 nsec in the preferred embodiment). Accordingly, the timing relationships depicted in timing chart 148 repeats for subsequent cell intervals. Timing chart 148 indicates the synchronous arrival of the first four bit nibbles of two ATM data cells from two of ATM input data streams 22. Subsequent nibbles of these cells follow the first nibbles at 1.33 nsec intervals in the preferred embodiment until an entire cell has been switch through switch card 26 then the process repeats for other ATM cells.

In summary, a switch system and method are provided for switching a plurality of input data streams into a plurality of output data streams. The system includes a non-blocking, single stage space switch capable of switching a large number of high speed input data streams. The switch is implemented in low voltage differential signaling (LVDS) semiconductor components in order to accommodate the high data rates of the input data streams. The system size is greatly reduced and system reliability is increased at low cost by replacing the few uniform length cable assemblies of prior art systems with a backplane assembly having a multiplicity of transmission lines on a printed circuit board medium. In addition, a timing compensation element is incorporated into the system to mitigate propagation delays associated with differing path lengths of the differing transmission lines.

Although the preferred embodiments of the invention have been illustrated and described in detail, it will be readily apparent to those skilled in the art that various modifications may be made therein without departing from the spirit of the invention or from the scope of the appended claims. For example, the configuration of input and output modules and the number of circuit cards may be adjusted. Furthermore, the system may be adapted to faster and slower data rates of asynchronous transfer mode data streams.

What is claimed is:

1. A system for switching a plurality of input data streams into a plurality of output data streams, said system comprising:
   a switch fabric;
   a clock circuit for generating a clock signal;
   a first timing compensation element adapted to receive said clock signal and a first input data stream, said first timing compensation element being configured to impart a first time delay to said first input data stream;
   a second timing compensation element adapted to receive said clock signal and a second input data stream, said second timing compensation element being configured to impart a second time delay to said second input data stream;
   a first transmission path coupled between said first timing compensation element and said switch fabric; and
   a second transmission path coupled between said second timing compensation element and said switch fabric;
   wherein said first and second transmission paths exhibit differing lengths, and said first and second time delays differ to compensate for said length difference between said first and second transmission paths so that said first and second input data streams arrive at said switch fabric substantially synchronously.

2. A system as claimed in claim 1 wherein said first and second timing compensation elements are two of a multiplicity of timing compensation elements, and each of said multiplicity of timing compensation elements receives said clock signal and one of said plurality of input data streams and imparts a time delay to said one of said plurality of input data streams.

3. A system as claimed in claim 1 wherein:
   said first timing compensation element comprises a first settable delay circuit configured to delay said clock signal and means, coupled to said first settable delay circuit, for causing said first settable delay circuit to delay said clock signal said first time delay; and
   said second timing compensation element comprises a second settable delay circuit configured to delay said clock signal and means, coupled to said second settable delay circuit, for causing said second settable delay circuit to delay said clock signal said second time delay.

4. A system as claimed in claim 3 wherein:
   said system further comprises a controller in communication with said first and second timing compensation elements, said controller being configured to predetermine a first control value representative of said first time delay and a second control value representative of said second time delay;
   said means for causing said first time delay comprises a first register configured to hold said first control value; and
   said means for causing said second time delay comprises a second register configured to hold said second control value;

wherein said controller is configured to program said first and second registers with said first and second control values, respectively.

5. A system as claimed in claim 3 wherein:

said first settable delay circuit comprises a first counter configured to delay said clock signal a first integral number of clock cycles and a first delay element configured to delay said clock signal a first fraction of a clock cycle, said first counter and said first delay element being coupled to said means for causing said first time delay; and said second settable delay circuit comprises a second counter configured to delay said clock signal a second integral number of clock cycles and a second delay element configured to delay said clock signal a second fraction of a clock cycle, said second counter and said second delay element being coupled to said means for causing said second time delay.

6. A system as claimed in claim 3 wherein:

said first and second settable delay circuits generate first and second delayed clock signals, respectively;

said first timing compensation element additionally comprises a first register coupled to said first settable delay circuit, said first register being adapted to output a predetermined number of bits of said first data stream at instants in time defined by said first delayed clock signal; and said second timing compensation element additionally comprises a second register coupled to said second settable delay circuit, said second register being adapted to output a predetermined number of bits of said second data stream at instants in time defined by said second delayed clock signal.

7. A system as claimed in claim 1 wherein each of said first and second input data streams includes a plurality of asynchronous transfer mode (ATM) data cells, each of said ATM data cells occurring over a cell interval, and said system further comprises:

a first input interface circuit coupled to said first timing compensation element for receiving said ATM data cells included in said first data stream;

a second input interface circuit coupled to said second timing compensation element for receiving said ATM data cells included in said second data stream; and each of said first and second input interface circuits includes a cell priority determiner that identifies a switching priority for each of said ATM data cells.

8. A system as claimed in claim 7 wherein a subset of said ATM data cells defines a virtual circuit, and said cell priority determiner comprises:

a cell drop logic element which discards said ATM data cells in said subset when prior ones of said ATM data cells associated with said virtual circuit were previously flagged as being candidate cells for discard.

9. A system as claimed in claim 7 wherein a subset of said ATM data cells defines a virtual circuit, and said cell priority determiner comprises:

a cell drop logic element which decreases said switching priority for each of said ATM data cells in said subset when prior ones of said ATM data cells associated with said virtual circuit were previously flagged.

10. A system as claimed in claim 7 wherein:

said switch fabric has first and second outputs;

said system further comprises an arbiter module in communication with said first and second input interface circuits; and during each of said cell intervals, said arbiter module receives cell identities selected in response to said switching priorities for a plurality of said ATM data cells of said first input interface circuit, receives cell identities selected in response to said switching priorities for a plurality of said ATM data cells of said second input interface circuit, identifies one said plurality of said ATM data cells of said first input interface circuit to assign to said first output of said switch fabric, and identifies one said plurality of said ATM data cells of said second input interface circuit to assign to said second output of said switch fabric.

11. A system as claimed in claim 1 wherein said switch fabric is a single stage space switch configured for a data throughput of at least 160 gigabits per second.

12. A system as claimed in claim 11 wherein said first and second input data streams are included in said plurality of input data streams, each of said plurality of input data streams having a synchronous optical network (SONET) data rate of at least 2.5 gigabits per second, and said single stage space switch is configured to switch at least sixty-four of said input data streams into at least sixty-four of said output data streams substantially synchronously.

13. A system as claimed in claim 11 wherein said single stage space switch is implemented using low voltage differential signaling (LVDS) semiconductor components.

14. A system as claimed in claim 13 wherein:

said first transmission path includes a plurality of first transmission lines, each of said first transmission lines being configured to transfer a portion of said first input data stream to said single stage space switch; and said second transmission path includes a plurality of second transmission lines, each of said second transmission lines being configured to transfer a portion of said second input data stream to said single stage space switch.

15. A system as claimed in claim 1 wherein said system further comprises:

a first clock transmission line coupled between said clock circuit and said first timing compensation element, said first clock transmission line having a first clock path length configured to impose a first clock signal transmission delay on said clock signal at said first timing compensation element; and a second clock transmission line coupled between said clock circuit and said second timing compensation element, said second clock transmission line having a second clock path length configured to impose a second clock signal transmission delay on said clock signal at said second timing compensation element, and said first and second time delays additionally compensate for said first and second clock signal transmission delays imposed on said clock signal in response to said first and second clock path lengths.

16. A system as claimed in claim 1 wherein:

said transmission paths are integrated into a backplane assembly which has discrete circuit board slots;

said first timing compensation element, said second timing compensation element, and said switch fabric are implemented on separate circuit boards connected to separate ones of said discrete slots in said backplane assembly; and path lengths for said first and second transmission paths differ in said backplane assembly.

17. In a switch system, a method for switching a plurality of input data streams into a plurality of output data streams, said method comprising the steps of:

a) receiving a clock signal and a first input data stream at a first timing compensation element of said switch system;

b) receiving said clock signal and a second input data stream at a second timing compensation element of said switch system;

c) imparting a first programmable time delay on said first input data stream;

d) imparting a second programmable time delay on said second input data stream;

e) transmitting said first input data stream over a first transmission path to a switch fabric of said switch system;

f) transmitting said second input data stream over a second transmission path to said switch fabric, said first and second transmission paths exhibiting differing lengths, and said first and second time delays differing to compensate for said length difference between said first and second transmission paths;

g) receiving said first and second data streams at said switch fabric substantially synchronously in response to said first and second time delays.

18. A method as claimed in claim 17 further comprising the steps of:

predetermining a first control value representative of said first time delay;

predetermining a second control value representative of said second time delay;

programming a first register of said first timing compensation element with said first control value;

programming a second register of said second timing compensation element with said second control value;

delaying said clock signal at said first timing compensation element in response to said first control value to cause said first time delay to produce a first delayed clock signal;

delaying said clock signal at said second timing compensation element in response to said second control value to cause said second time delay to produce a second delayed clock signal;

outputting a predetermined number of bits of said first data stream at instants in time defined by said first delayed clock signal; and outputting a predetermined number of bits of said second data stream at instants in time defined by said second delayed clock signal.

19. A method as claimed in claim 17 wherein each of said first and second data streams includes a plurality of asynchronous transfer mode (ATM) data cells which occur over cell intervals, and said method further comprises the steps of:

identifying, in a first input interface circuit coupled to said first timing compensation element, a switching priority for each of said ATM data cells of said first data stream;

identifying, in a second input interface circuit coupled to said second timing compensation element, a switching priority for each of said ATM data cells of said second data stream;

selecting during each of said cell intervals, at each of said first and second input interface circuits, a portion of said ATM data cells in response to said switching priorities;

identifying during each of said cell intervals, at an arbiter module of said switch system, one of said portion of said ATM data cells from said first input interface circuit to assign to a first output of said switch fabric; and identifying, at said arbiter module, one of said portion of said ATM data cells from said second input interface circuit to assign to a second output of said switch fabric.

20. A switch system for switching a plurality of asynchronous transfer mode (ATM) input data streams into a plurality of ATM output data streams, said system comprising:

a single stage space switch circuit card configured to switch at least sixty-four of said ATM input data streams into at least sixty-four of said ATM output data streams at a data throughput of at least 160 gigabits per second;

a clock circuit card for generating a clock signal;

a plurality of input circuit cards, each of said input circuit cards having an input interface circuit configured to receive one of said ATM input data streams and a timing compensation element adapted to receive said clock signal, said timing compensation element being configured to impart a time delay to said one ATM input data stream; and a backplane assembly having a plurality of integral data transmission paths coupled between said input circuit cards and said single stage space switch circuit card for transmitting said ATM input data streams, a plurality of integral clock transmission lines coupled between said clock circuit card and each of said input circuit cards for transmitting said clock signal, and a plurality of circuit board slots;

wherein said single stage space switch circuit card, said clock circuit card, and each of said input circuit cards are connected to separate ones of said slots in said backplane assembly, data path lengths for said integral data transmission paths differ in said backplane assembly, clock path lengths for said integral clock transmission lines differ in said backplane assembly, and said time delays differ to compensate for said data and clock path lengths so that each of said ATM input data streams arrive at said single stage space switch circuit card substantially synchronously.

21. A switch system as claimed in claim 20 wherein:

said single stage space switch circuit card is implemented using low voltage differential signaling semiconductor components; and each of said integral data transmission paths includes a plurality of transmission lines, each of said transmission lines being configured to transfer a portion of said one ATM data stream to said single stage space switch circuit card.

* * * * *